(12) United States Patent
Srinivasaraghavan

(10) Patent No.: US 10,362,137 B2
(45) Date of Patent: Jul. 23, 2019

(54) HEBBIAN LEARNING-BASED RECOMMENDATIONS FOR SOCIAL NETWORKS

(71) Applicant: Verizon Patent and Licensing Inc., Arlington, VA (US)

(72) Inventor: Haripriya Srinivasaraghavan, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 670 days.

(21) Appl. No.: 14/979,738

(22) Filed: Dec. 28, 2015

(65) Prior Publication Data

US 2017/0188101 A1    Jun. 29, 2017

(51) Int. Cl.
*H04L 12/26* (2006.01)
*H04L 29/08* (2006.01)
(Continued)

(52) U.S. Cl.
CPC ............ *H04L 67/306* (2013.01); *G06F 11/34* (2013.01); *G06F 11/3438* (2013.01); *H04L 43/04* (2013.01); *H04L 67/10* (2013.01); *H04L 67/20* (2013.01); *H04L 67/30* (2013.01); *H04N 21/252* (2013.01); *H04N 21/25891* (2013.01);
(Continued)

(58) Field of Classification Search
CPC ....... H04L 43/00; H04L 43/04; H04L 43/045; H04L 43/08; H04L 43/876; H04L 43/12; H04L 67/00; H04L 67/20; H04L 67/22; H04L 67/30; H04L 67/306; G06F 11/00; G06F 11/30; G06F 11/34; G06F 11/3438; H04N 21/00; H04N 21/20; H04N 21/25; H04N 21/251; H04N 21/252; H04N 21/45; H04N 21/462; H04N 21/4622; H04N 21/466; H04N 21/4668; H04N 21/47;
(Continued)

(56) References Cited

U.S. PATENT DOCUMENTS 8,606,721 B1 * 12/2013 Dicker ................... G06Q 50/01
705/319
8,719,347 B1 * 5/2014 Tomkins ................. G06F 12/06
709/204

(Continued)

*Primary Examiner* — Tauqir Hussain
*Assistant Examiner* — Boris D Grijalva Lobos

(57) ABSTRACT

A network device applies Hebbian-based learning to provide content recommendations in content-based social networks. The method includes obtaining customer activity data for a content-based social network; modeling the customer activity data as nodes and edges within the content-based social network, the nodes representing users and the edges representing connections between the users; assigning initial weights to the edges, that correspond to a connection strength, based on user-designated of relationships between the nodes; adjusting the initial weights in response to temporally correlated activity between the nodes from the customer activity data, to provide adjusted weights; identifying a content recommendation for a particular node based on an activity to access content by another node and one or more of the adjusted weights; storing a customer profile including the content recommendations associated with a node; and providing the content recommendation to a user device associated with the customer profile.

20 Claims, 15 Drawing Sheets

(51) Int. Cl.
*G06F 11/34* (2006.01)
*H04N 21/25* (2011.01)
*H04N 21/258* (2011.01)
*H04N 21/45* (2011.01)
*H04N 21/466* (2011.01)
*H04N 21/4788* (2011.01)
*H04N 21/482* (2011.01)
*H04N 21/84* (2011.01)

(52) U.S. Cl.
CPC ..... *H04N 21/4532* (2013.01); *H04N 21/4662* (2013.01); *H04N 21/4668* (2013.01); *H04N 21/4788* (2013.01); *H04N 21/4826* (2013.01); *H04N 21/84* (2013.01)

(58) Field of Classification Search
CPC ............. H04N 21/478; H04N 21/4788; H04N 21/482; H04N 21/4826
See application file for complete search history.

(56) References Cited

U.S. PATENT DOCUMENTS

| | | | | |
|---|---|---|---|---|
| 8,935,422 | B1* | 1/2015 | Terleski | G06Q 50/01 709/231 |
| 9,317,610 | B2* | 4/2016 | Vaynblat | G06F 3/0481 |
| 9,367,823 | B1* | 6/2016 | Mihalik | G06F 17/3053 |
| 9,648,581 | B1* | 5/2017 | Vaynblat | H04W 64/006 |
| 9,661,039 | B2* | 5/2017 | Cheng | H04L 65/40 |
| 9,747,551 | B2* | 8/2017 | Wang | G06N 5/04 |
| 9,818,146 | B2* | 11/2017 | Caralis | G06Q 30/0631 |
| 9,882,863 | B2* | 1/2018 | Arquette | H04L 51/32 |
| 9,886,522 | B2* | 2/2018 | Zhang | G06F 17/30958 |
| 2005/0138493 | A1* | 6/2005 | Barford | H04L 41/06 714/712 |
| 2007/0112730 | A1* | 5/2007 | Gulli | G06F 17/30864 |
| 2007/0226248 | A1* | 9/2007 | Darr | G06Q 10/10 |
| 2009/0106822 | A1* | 4/2009 | Obasanjo | G06Q 10/107 726/4 |
| 2009/0248709 | A1* | 10/2009 | Fuhrmann | G06Q 10/10 |
| 2009/0248852 | A1* | 10/2009 | Fuhrmann | G06Q 10/10 709/224 |
| 2011/0004692 | A1* | 1/2011 | Occhino | H04L 67/16 709/228 |
| 2011/0246483 | A1* | 10/2011 | Darr | G06Q 10/10 707/748 |
| 2012/0001919 | A1* | 1/2012 | Lumer | G06F 17/30705 345/440 |
| 2012/0095863 | A1* | 4/2012 | Schiff | G06Q 30/0631 705/26.7 |
| 2012/0290649 | A1* | 11/2012 | Ramirez | H04L 67/22 709/204 |
| 2012/0324027 | A1* | 12/2012 | Vaynblat | G06Q 50/01 709/206 |
| 2013/0024456 | A1* | 1/2013 | Goodson | G06F 16/951 707/740 |
| 2013/0159112 | A1* | 6/2013 | Schultz | G06Q 30/02 705/14.66 |
| 2013/0297689 | A1* | 11/2013 | Bhat | G06F 17/2785 709/204 |
| 2014/0067944 | A1* | 3/2014 | Jackson | G06Q 50/01 709/204 |
| 2014/0067953 | A1* | 3/2014 | Weinstein | G06Q 10/10 709/204 |
| 2014/0115010 | A1* | 4/2014 | Seth | G06Q 50/01 707/798 |
| 2014/0214944 | A1* | 7/2014 | Sadan | H04L 67/22 709/204 |
| 2014/0214945 | A1* | 7/2014 | Zhang | H04L 67/306 709/204 |
| 2014/0280576 | A1* | 9/2014 | Cowan | H04L 67/306 709/204 |
| 2014/0297739 | A1* | 10/2014 | Stein | H04L 67/22 709/204 |
| 2015/0058757 | A1* | 2/2015 | Tseng | H04L 51/32 715/758 |
| 2015/0249704 | A1* | 9/2015 | Shah | G06F 3/0481 715/734 |
| 2016/0188727 | A1* | 6/2016 | Waibel | G06F 16/9535 707/758 |

* cited by examiner

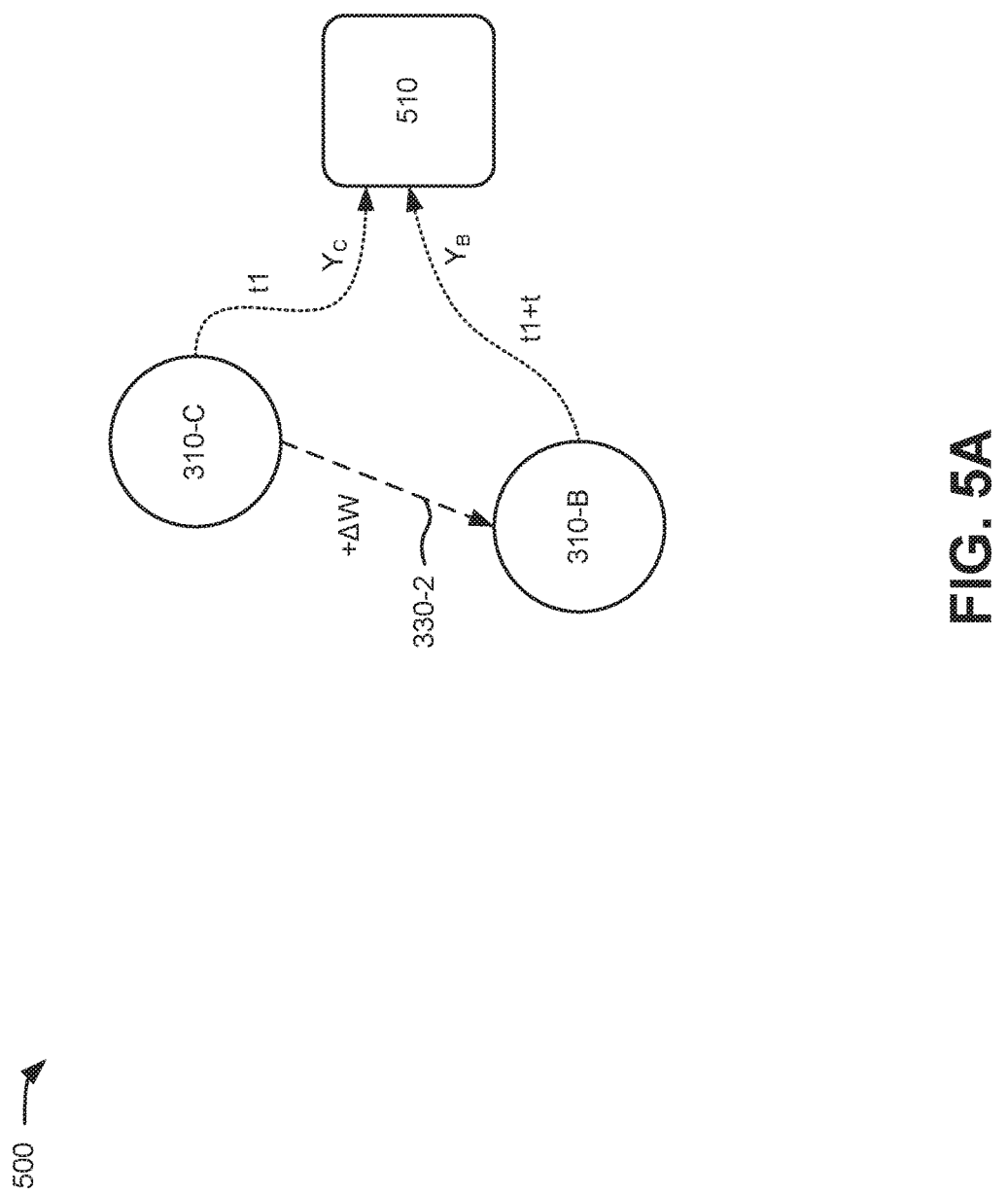

HEBBIAN LEARNING-BASED RECOMMENDATIONS FOR SOCIAL NETWORKS

BACKGROUND

Mobile video provides an alternative to traditional content viewing formats, such as broadcast or cable television. Mobile video programming services have been introduced that provide over-the-top (OTT) services for viewing, sharing, and social interaction. These mobile video programming services provide an opportunity to users to both consume and promote user-generated, short-form video as well as traditional content from broadcasters (e.g., CBS, ESPN, HBO, etc.). In many cases, mobile video programming services may be offered to consumers through use of a software application ("app") or an account that enables the consumer to access these services. In some instances, app users or account holders for a particular mobile video programming service may be viewed as a social network, and more particularly as a content-based social network. In other instances, a content-based social network may be linked with other services to form larger social networks.

BRIEF DESCRIPTION OF THE DRAWINGS

FIGS. 5A-5C are diagrams illustrating connection strength variations in a portion of a social network;

DETAILED DESCRIPTION OF PREFERRED EMBODIMENTS

Figure 1:
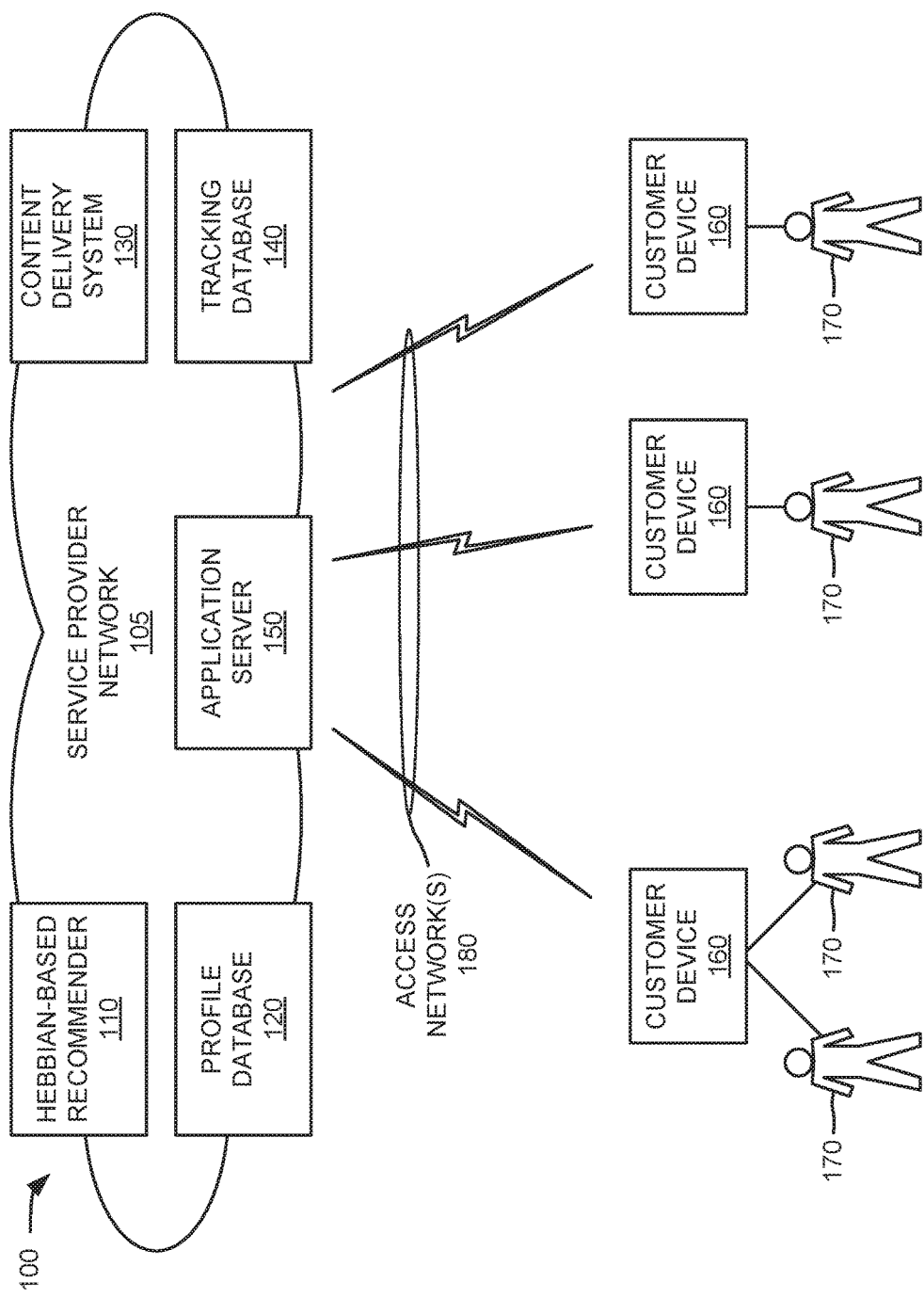
FIG. 1 is a diagram illustrating an exemplary environment in which a Hebbian-based recommender may be implemented.

The following detailed description refers to the accompanying drawings. The same reference numbers in different drawings may identify the same or similar elements.

Hebbian learning is a well-known neuroscience theory, introduced by Donald Hebb, which proposes an explanation for the adaptation of neurons in the brain during the learning process. According to Hebb's rule, when one neuron "A" repeatedly takes part in the excitation of another neuron "B," over time, the strength of connection from neuron "A" to neuron "B" increases. There is a temporal element in determining what constitutes the excitation of a neuron. Hebb's rule may be generalized as $$\Delta w_i = \eta x_i y,$$

where the change in the $i^{th}$ synaptic weight $w_i$ is equal to a learning rate $\eta$ times the $i^{th}$ input $x_i$ times the response $y$, and where $y$ is $$y = \sum_j w_j x_j$$

As described further herein, content-based social networks are modeled as multiple types of entities which can be designated as nodes and edges in a network graph. Particularly, users (i.e., people) and content may be designated as nodes, and relationships (e.g., based on direct or indirect activities) may be designated as edges between the nodes. Edges may be assigned weights according to the strength of the relationships, and assigned a direction according to a direction of the relationships. Similar to Hebbian learning principles, the strength of connection from one node (e.g., node A) to another node (e.g., node B) may increase whenever node A performs an activity that is seen as activating (e.g., initiating an action by) node B.

The resulting changes in connection strength can then be interpreted and used to generate recommendations within the content-based social network. Particularly, a Hebbian-based recommender may identify groupings of nodes based on their activity, identify friends in the social network, discover and predict trends based on the strength of connections, provide notifications of a node's activity to other nodes with strong connections with that node, and identify influencer nodes for the content-based social network.

According to an implementation, a network device applies Hebbian-based learning to provide content recommendations in content-based social networks. The method includes obtaining customer activity data for a content-based social network; modeling the customer activity data as nodes and edges within the content-based social network, the nodes representing users and the edges representing connections between the users; assigning initial weights to the edges, that correspond to a connection strength, based on user-designated relationships between the nodes; adjusting the initial weights in response to temporally correlated activity between the nodes from the customer activity data, to provide adjusted weights; identifying a content recommendation for a particular node based on an activity to access content by another node and one or more of the adjusted weights; storing a customer profile including the content recommendations associated with a node, and providing the content recommendation to a user device associated with the customer profile.

The term "content" as used herein, is intended to be broadly interpreted to include visual data, audio data, a combination of audio data and visual data, or other form of media content. By way of example, content may include television and internet content provided via wired or wireless internet connection. Television content may include live-programming (e.g., a live broadcast, etc.), movies, sports, television shows, video-on-demand (VoD) content, premium channel content, and pay-per-view (PPV) content. Internet content may include podcasts, web sites, streaming media, etc. The content may be in various formats, such as, for example, standard definition, high-definition, etc. Other forms of media content may include books (electronic or printed), discussion topics in a forum, news items or news articles, advertisements, etc. Also, the term "customer" and "user" is used interchangeably.

FIG. 1 is a diagram illustrating an exemplary environment 100 in which a Hebbian-based recommender may be implemented. As illustrated in FIG. 1, environment 100 may include a service provider network 105 and multiple users 170 associated with customer devices 160. Service provider network 105 may include, among other devices, a Hebbian-based recommender 110, a profile database 120, a content delivery system 130, a tracking database 140, and an application server 150. Customer devices 160 may connect to service provider network via one or more access networks 180.

The number of devices and networks, and the configuration in environment 100 is exemplary and provided for simplicity. In practice, according to other embodiments, environment 100 may include additional devices, fewer devices, different devices, and/or differently-arranged devices, than those illustrated in FIG. 1. For example, environment 100 may include additional networks, fewer networks, and/or differently-arranged networks, than those illustrated in FIG. 1. For example, customer network 180 may include a local area network (LAN). Environment 100 may include wired and/or wireless connections among the devices illustrated.

Service provider network 105 may include a network that distributes or makes available a service, such as, television service, mobile service, and/or Internet service. Service provider network 105 may be a satellite-based network and/or a terrestrial-based network. Although not illustrated, service provider network 105 may include, for example, content distribution devices, content storage devices, billing devices, security devices, etc.

Hebbian-based recommender 110 may generate recommendations to users 170. According to an exemplary embodiment, Hebbian-based recommender 110 may identify connections within social networks and/or content-based social networks. For example, Hebbian-based recommender 110 may identify a social network with the nodes consisting of people (e.g., users 170) and other content and the relationships between them as a network of nodes and connections between the nodes. Hebbian-based recommender 110 may increase the strength of connection from a first node a second node, whenever the first node performs an activity that is seen as activating the second node. The resulting changes in connection strength can then be interpreted in different ways and used to implement features provided by service provider network 105, as describe further herein.

Profile database 120 may include a database that stores user profiles based on user preferences and information collected from content delivery system 130, tracking database 140, and/or customer devices 160. For example, profile database 120 may store information that associates particular content, content metadata, social contacts, or other information with particular user profiles. In one implementation, each profile in profile database 120 may have an initial period (e.g., five days, ten days, etc.) before the profile is deemed mature enough for use by Hebbian-based recommender 110 in providing recommendations.

Content delivery system 130 may include a network device that makes content (e.g., multimedia content) available for users (e.g., users 170) to consume (e.g., buy, rent, share, or otherwise consume). Available content in content delivery system 130 may include television content, video-on-demand content, peer-to-peer content, etc. In some implementations, content delivery system 130 may include a content catalog with a list of available content items along with other content metadata, such as features or categories, that is available via service provider network 105.

Tracking database 140 may include a network device that stores a data structure with records of activity pertaining to users 170 use of content delivery system 130. In one implementation, tracking database 140 may log activity of users 170 within the same content-based social network. Logged activity stored in tracking database 140 may include, for example, a content selection identifier, a user identifier, and a selection time associated with each selection of content by a user 170.

Application server 150 may include a network device that permits customer devices 160 to download a client application or use a website that permits users 170 to find and/or access digital content of interest. The client application or website may enable customer devices 160 to present, to user 170 of customer device 160, recommendations determined by Hebbian-based recommender 110. For example, application server 150 may provide to customer devices 160 interactive content listings based on a content catalog from content delivery system 130 and recommendations for particular content items. Recommendations may be included, for example, as part of a sponsored link, a social media message, an advertisement, or a notification within a user interface.

Customer device 160 includes an end device that may enable user 170 to communicate with service provider network 105. For example, customer device 160 may include a smartphone, a tablet computer, a personal computer (e.g., a laptop or desktop PC), an Internet-enable television (e.g., a smart TV), a set-top box (STB), a gaming system, or another type of computational or communication device that can communicate with devices in environment 100. In one implementation, customer device 160 may include one or more applications to access data (e.g., multimedia content) from service provider network 105 via access network 180.

Users 170 may include users of customer devices 160. User 170 may be associated with a particular customer device 160 or share access to a customer device 160 with other users 170 (e.g., using, for example, different accounts and credentials). In one implementation, users 170 may use the same app or have an account for a particular mobile video programming service that defines a content-based social network. For example, services such as GO90 by Verizon and WATCHABLE by Comcast require an app and/or account that may be used to define a social network of users 170.

Access network 180 may include a network that permits transfer of data between customer devices 160 and service provider network 105. Access network 180 may include, for example, a telecommunications network (e.g., a Public Switched Telephone Network (PSTN)), wired (e.g., Ethernet) and/or wireless local area network(s) (LAN) (e.g., Wi-Fi), wireless wide area networks (WAN) (e.g., WiMax), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein. Additionally, access network 180 may include, among other things, a firewall, a filtering mechanism, a proxy, and/or network address translation mechanisms. Although shown as a single element in FIG. 1, access network 180 may include a number of separate networks that function to provide services to customer devices 160.

Figure 2:
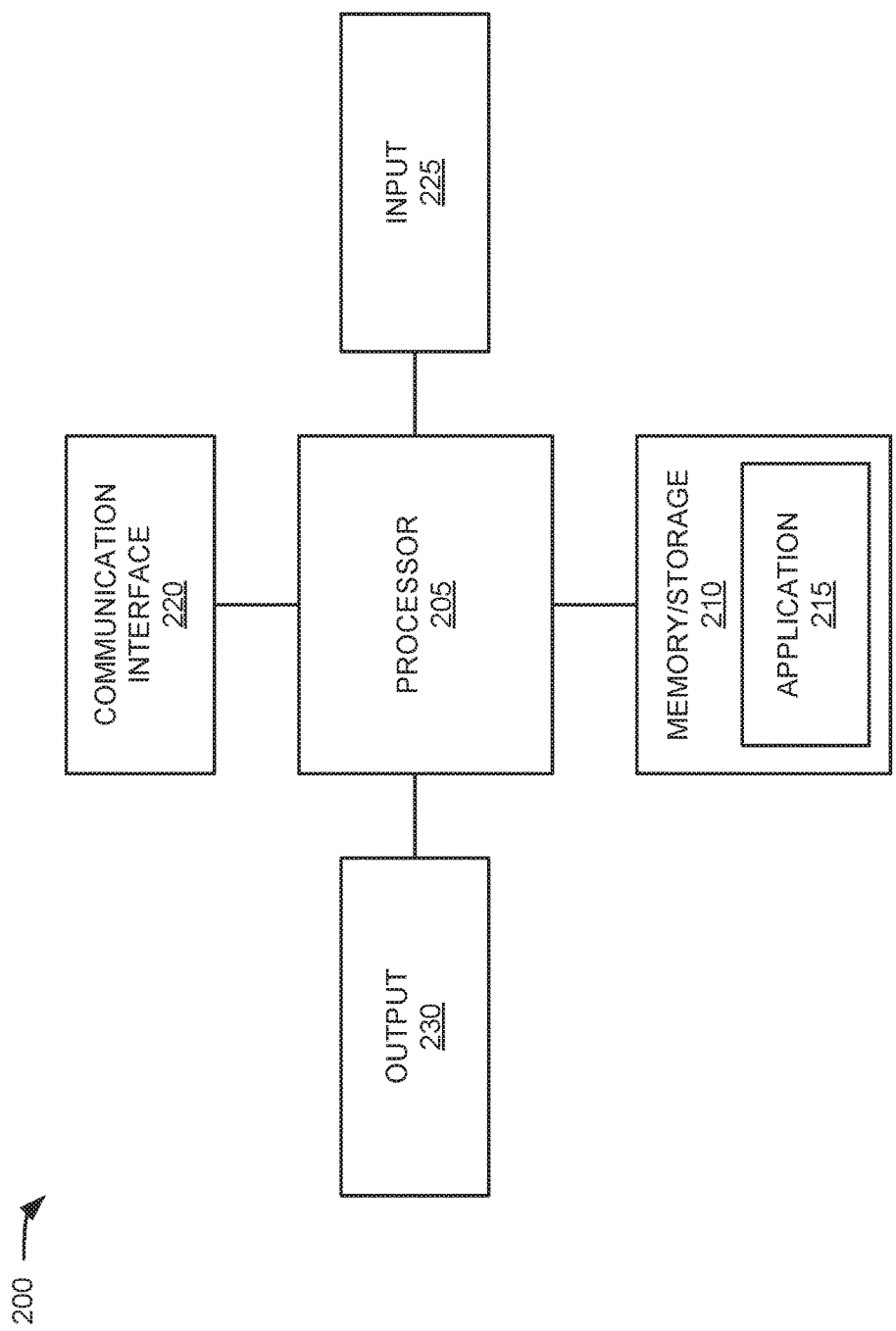
FIG. 2 is a diagram illustrating exemplary components of a device that may correspond to one or more of the devices in the environment depicted in FIG. 1.

FIG. 2 is a diagram illustrating exemplary components of a device 200 that may correspond to one or more of the devices in environment 100. For example, device 200 may correspond to one or more devices in service provider network 105 (e.g., Hebbian-based recommender 110, application server 150) and/or customer device 160. As illustrated, according to an implementation, device 200 may include a processor 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processor 205 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SOCs), central processing units, microcontrollers, and/or some other component that may interpret and/or execute instructions and/or data. Depending on the type of processor 205, processor 205 may be implemented as hardware, a combination of hardware and software, may include a memory (e.g., memory/storage 210), etc.

Processor 205 may control the overall operation or a portion of operation(s) performed by device 200. Processor 205 may perform one or multiple operations based on an operating system and/or various applications (e.g., application 215). Processor 205 may access instructions from memory/storage 210, from other components of device 200, and/or from a source external to device 200 (e.g., a network, another device, etc.).

Memory/storage 210 may include one or multiple memories and/or one or multiple other types of tangible storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 210 may include a hard disk (e.g., a magnetic disk, an optical disk, a magneto-optic disk, a solid state disk, etc.) or a floppy disk (e.g., a zip disk, etc.) and a corresponding drive, a tape, a Micro-Electromechanical System (MEMS)-based storage medium, and/or a nanotechnology-based storage medium. Memory/storage 210 may be external to and/or removable from device 200, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 210 may store data, application(s), and/or instructions related to the operation of device 200. Memory/storage 210 may store data, application(s), and/or instructions related to the operation of device 200.

Application 215 may include software or a program that provides various services and/or functions. For example, with reference to customer device 160, application 215 may include an application or a program for a mobile video app in a content-based social network, an app for providing digital content, an app providing social media platforms, etc. As another example, with reference to Hebbian-based recommender 110, application 215 may include a program to model nodes and edges in a content-based social network.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, and/or the like.

Input 225 may permit an input into device 200. For example, input 225 may include a keyboard, a mouse, a camera, a scanner, a microphone, a display, a touchpad, a button, a switch, an input port, voice recognition logic, fingerprint recognition logic, a web cam, and/or some other type of visual, auditory, tactile, etc., input component. Output 230 may permit an output from device 200. For example, output 230 may include a speaker, a display, a light, an output port, and/or some other type of visual, auditory, tactile, etc., output component.

As described herein, device 200 may perform processes in response to processor 205 executing instructions (e.g., application 215) stored by memory/storage 210. By way of example, the instructions may be read into memory/storage 210 from another memory/storage 210 or from another device via communication interface 220. The instructions stored by memory/storage 210 may cause processor 205 to perform one or more processes described herein. Alternatively, for example, according to other implementations, device 200 may perform one or more processes described herein based on the execution of hardware (processor 205, etc.), the execution of hardware and firmware, or the execution of hardware, software, and firmware.

As previously described, Hebbian-based recommender 110 may use historical data to identify strength of connections between nodes (e.g., user 170 and/or content items available from service provider network 105) to identify groupings, generate recommendations, identify trends, and/or trigger notifications. For example, Hebbian-based recommender 110 may aggregate data and/or information pertaining to users, content viewed, and upcoming content and store the data and/or information in the form of customer profiles (e.g., in profile database 120). Alternatively, other devices may aggregate the data and/or information and make this data and/or information available to Hebbian-based recommender 110. For example, service provider network 105 may include a data center that stores content for delivery to users and tracks user interactions with the content.

Figure 3:
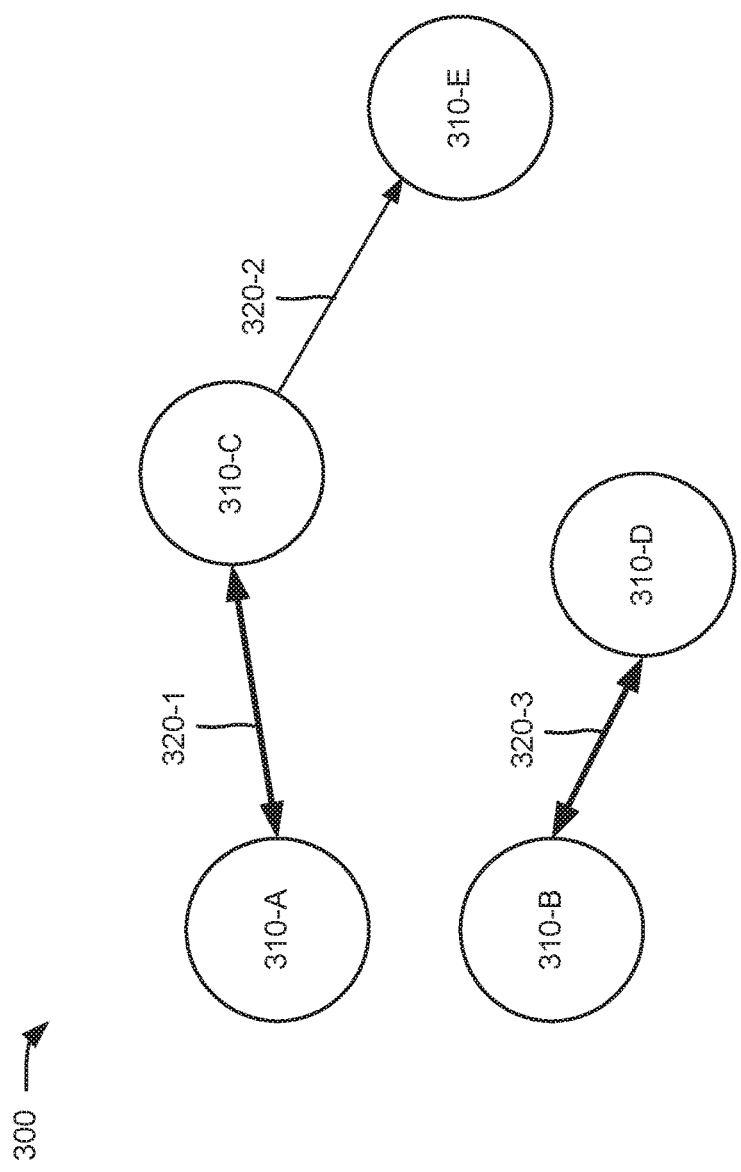
FIG. 3 is a diagram illustrating a sample social network with weighted connections.

FIG. 3 is a diagram illustrating a sample social network model 300 with weighted connections. As shown in FIG. 3, social network model 300 includes multiple customer nodes 310 and direct connections 320 that are illustrative of connections that may be detected by Hebbian-based recommender 110 based on collected data from multiple customer devices 160. In FIG. 3, nodes 310 may generally represent individual users 170.

As shown in FIG. 3, nodes 310-A and 310-C are "friends" (e.g., a user-designated social media connection agreed upon by two users) indicating a bidirectional connection, shown as connection 320-1. Similarly, nodes 310-B and 310-D are friends with bidirectional connection 320-3. As also shown in FIG. 3, node 310-E is a "follower" (e.g., a user-designated social media connection of a single user to receive information from another user) of node 310-C, indicating a unidirectional connection 320-2. According to implementations herein, connections between nodes 310 may be assigned weights to designate strength of a relationship between each node 310. The strength of a relationship and a corresponding weight value may correlate initially to a user designation (e.g., as a friend, follower, no designation, etc.) and may be changed as Hebbian-based recommender 110 identifies activities (such as selection or recommendation of particular content) by one node 310 that activates another node 310 (e.g., causes the user to select the same particular content).

Connections 320 in FIG. 3 may be assigned a default weight value, such as 1. Other edges (not labeled) between nodes 310 may be assigned a comparatively small non-zero value e, such as 0.001. In practice, there may be many unconnected nodes. The total number of unidirectional edges for a given number of nodes can be given as n*(n−1), where n is the number of nodes and (n−1) represents the number of edges for each node. Thus, as shown in Table 1 below, of 20 possible edges in the arrangement of FIG. 3, five intentional connections 320 may be assigned a weight value of 1, while the remaining 15 edges may be assigned a weight value of 0.001.

TABLE 1

| Edge | Weight (W) |
| --- | --- |
| A-to-C | 1 |
| C-to-A | 1 |
| B-to-D | 1 |
| D-to-B | 1 |
| C-to-E | 1 |
| A-to-B | 0.001 |
| B-to-A | 0.001 |
| A-to-D | 0.001 |
| D-to-A | 0.001 |
| A-to-E | 0.001 |
| E-to-A | 0.001 |
| B-to-C | 0.001 |
| C-to-B | 0.001 |
| B-to-E | 0.001 |
| E-to-B | 0.001 |
| C-to-D | 0.001 |
| D-to-C | 0.001 |
| E-to-C | 0.001 |
| D-to-E | 0.001 |
| E-to-D | 0.001 |

Figure 4:
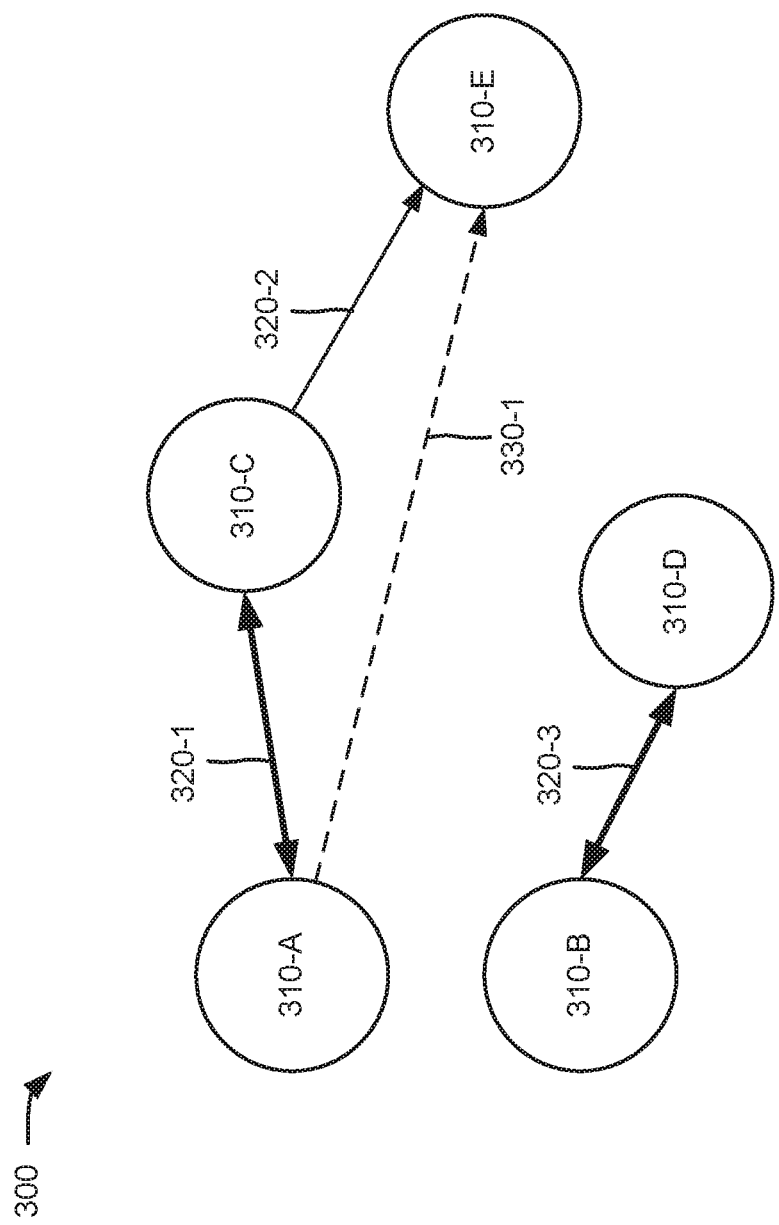
FIG. 4 is a diagram illustrating an indirect connection in the sample social network.

FIG. 4 is a diagram illustrating an indirect connection in social network model 300. As shown in FIG. 4, social network model 300 includes multiple customer nodes 310, direct connections 320, and an indirect connection 330 illustrative of connections that may be detected by Hebbian-based recommender 110 based on collected data from content delivery system 130 and multiple customer devices 160.

In the example of FIG. 4, node 310-A may have an indirect connection 330-1 to node 310-E because node 310-A and node 310-C are friends and node 310-E follows node 310-C. Based on the collected data, Hebbian-based recommender 110 detects the following of node 310-E relative to node 310-C. Similar to direct connections 320, indirect (or non-deliberate) connections 330 may also be assigned weights. More particularly, indirect connections 330 may be assigned weight values that are a function of the weights of the intervening connections. Thus, connection 330-1 in FIG. 4 may be assigned a weight value that is a function of intervening connections 320-1 and 320-2. In one implementation, the function of the intervening connections may include a chain weight factor, c, such that the weight assigned to any indirection connection is the result of the multiplied weights of the intervening connections times the chain factor. Thus, connection 330-1 in FIG. 4 may be assigned an initial weight value of W=c*1*1. Assuming the chain weight factor, c, is assigned a value of less than 1, the initial weight value, W, will indicate strength of the indirect connection 330-1 that is relatively weaker than the strength of either of connections 320-1 or 320-2.

Figure 5B:
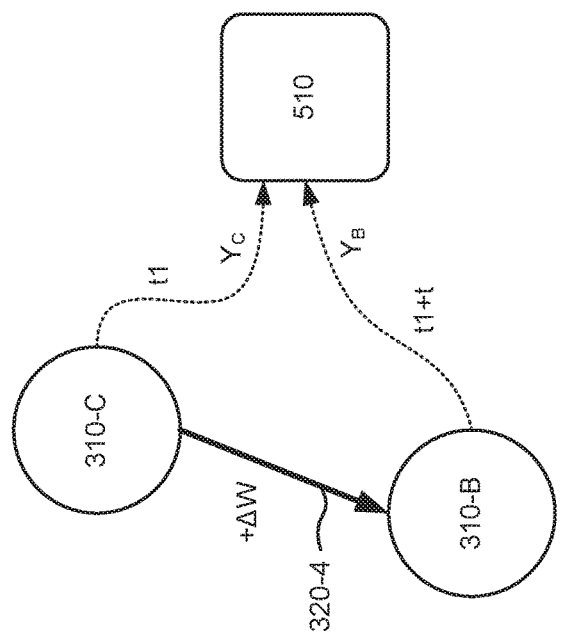
Figure 5C:
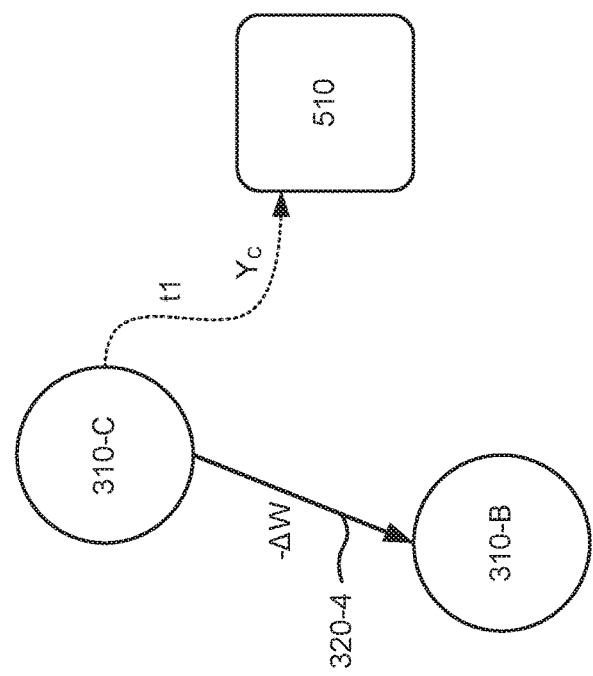

FIGS. 5A-5C are diagrams illustrating connection strength variations in a social network 500. As shown in FIGS. 5A-5C, social network 500 includes multiple customer nodes 310 and a content node 510 such that connections may be detected by Hebbian-based recommender 110 based on collected data from multiple customer devices 160. In social network 500, node 510 may represent particular content viewed on customer devices 160.

FIG. 5A illustrates how temporally correlated activity by two unconnected nodes 310 on the same content node 510 can result in connection strengthening. In FIG. 5A, assume node 310-B and node 310-C are two nodes (e.g., users 170) without any explicit connections between them. Assume node 310-C accesses (e.g., views, downloads, etc.) content node 510 at time t1 (the accessing indicated as $Y_C$), and that node 310-B accesses the same content node 510 at time t1+t (the accessing indicated as $Y_B$). A correlation time window, T, having a particular value representing a time period, may be used as an influence threshold value. For example, if the value of t is less than the value of time window T, then the act to access content node 510 by node 310-C might have been influenced by node 310-B, even though an explicit weight assigned to a connection or other attribute of the connection (unidirectional, etc.) between node 310-C and node 310-B does not predict that influence.

When Hebbian-based recommender 110 detects that node 310-B accesses node 510 after node 310-C and within the correlation time window T, Hebbian-based recommender 110 may increase the weight (W) of indirect connection 330-2. The amount of increase in weight (+ΔW) can be proportional to the difference between an expected outcome and the actual outcome. For example, using the default values described in connection with FIG. 3, weight W of connection 330-2 (i.e., C-to-B) was initially 0.001, making the expected probability of the outcome $Y_B$ matching $Y_C$ close to 0. Hence, the actual outcome value (e.g., 1) minus the expected outcome (e.g., essentially 0) is close to 1. Hence, the weight increase, +ΔW, for the connection 330-2 (i.e., C-to-B) will be higher or proportional to the difference between actual and expected outcomes.

FIG. 5B illustrates how temporally correlated activity by two already connected nodes on the same content results in only slight increases in connection strength. In FIG. 5B, assume node 310-B and node 310-C are two nodes (e.g., users 170) with an explicit connection 320-4 between them (e.g., B is a follower of C). Assume node 310-C accesses (e.g., views, downloads, etc.) content node 510 at time t1 (indicated as $Y_C$), and that node 310-B accesses the same content node 510 at time t1+t (indicated as $Y_B$). A correlation time window, T, may again be used as an influence threshold. If t is less than T, then the act to access content node 510 by node 310-C might have influenced node 310-B, which is consistent with the fact that there is a heavy weight connection between them.

When Hebbian-based recommender 110 detects that node 310-B accesses node 510 after node 310-C and within the correlation time window T, Hebbian-based recommender 110 may slightly increase the weight (W) of connection 320-4. The amount of increase in weight (+ΔW) can be proportional to the difference between an expected outcome and the actual outcome, which would be small in this example. Particularly, using the default values described in connection with FIG. 3, weight W of connection 320-4 (i.e., C-to-B) was initially 1, making the expected probability of the outcome $Y_B$ matching $Y_C$ close to 1. Hence, the actual outcome value (e.g., 1) minus the expected outcome (e.g., essentially 1) is close to 0. Hence, the weight increase, $+\Delta W$, for the connection 320-4 (i.e., C-to-B) will be small or proportional to the difference between actual and expected outcomes.

FIG. 5C illustrates how temporally uncorrelated activity by two already connected nodes on the same content can result in connection weakening. Similar to the example of FIG. 5B, assume node 310-B and node 310-C are two nodes (e.g., users) with an explicit connection 320-4 between them (e.g., B is a follower of C). Assume node 310-C accesses (e.g., views, downloads, etc.) content node 510 at time t1 (the accessing indicated as $Y_C$). However, node 310-B does not access the same content node 510 within the correlation time window T. The failure of node 310-B to access content node 510 indicates node 310-C did not influence node 310-B, which is inconsistent with the fact that there is a heavy weight connection between them.

When Hebbian-based recommender 110 detects that node 310-B does not access node 510 after node 310-C within the correlation time window 7T, Hebbian-based recommender 110 may decrease the weight (W) of connection 320-4. The amount of increase in weight ($+\Delta W$) can be proportional to the difference between an expected outcome and the actual outcome, which would be high in this example. The learning rate for decreasing the weights (as in FIG. 5C) can be different than the learning rate for increasing the weights (as in FIGS. 5A and 5B). Thus, Hebbian-based recommender 110 can allow for a slower decrease of weights when previously strongly connected nodes go out of sync, whereas increase can be faster. That is, Hebbian-based recommender 110 can increase the connection strength of previously unconnected nodes more quickly when the nodes have correlated activity on the same content.

In another implementation, Hebbian-based recommender 110 may apply multiple correlation time windows $T_1$, $T_2$, etc., For example, temporally correlated activity by two nodes within the correlation time window $T_1$ may the cause a higher weight increase, $+\Delta W$, than temporally correlated activity by two nodes within the correlation time window $T_2$.

Figure 6:
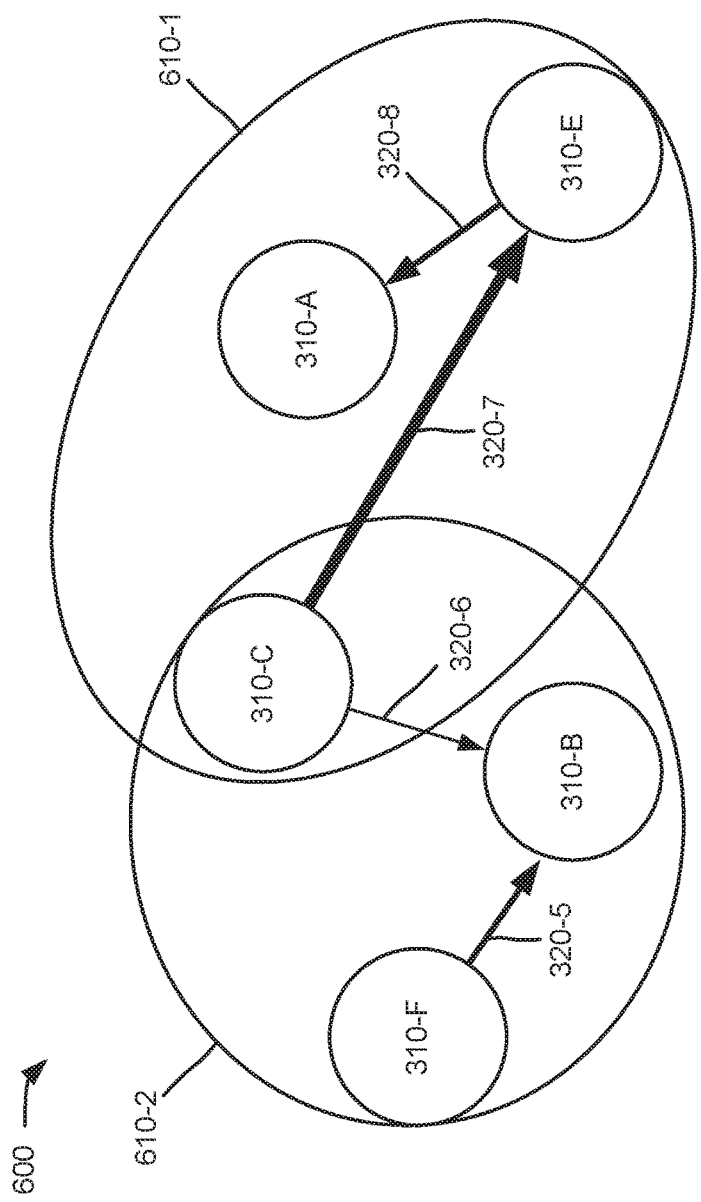
FIG. 6 is a diagram illustrating groupings based on connection strength in a portion of a social network.

FIG. 6 is a diagram illustrating groupings based on connection strength in a portion of a social network 600. In FIG. 6, assume node 310-C, node 310-E, and node 310-A share strong connections 320-7 (i.e., C-to-E) and 320-8 (i.e., E-to-A). Also assume that node 310-F and node 310-B share a strong connection (i.e., F-to-B), and that node 310-C and node 310-B share a weak connection (i.e., C-to-B). In this example, Hebbian-based recommender 110 may identify two groups, 610-1 and 610-2. The criteria for group forming can be based on connectivity, threshold weights, and/or number of groups desired. According to implementations herein, groups can be learned by Hebbian-based recommender 110 through the use of clustering and other unsupervised machine learning algorithms. Hebbian-based recommender 110 may apply a similar approach to content nodes to group content with other content using correlated activity on those content nodes. Hebbian-based recommender 110 may also use various attributes of the content to group content, such as genre, cast, crew, and so forth.

Figure 7:
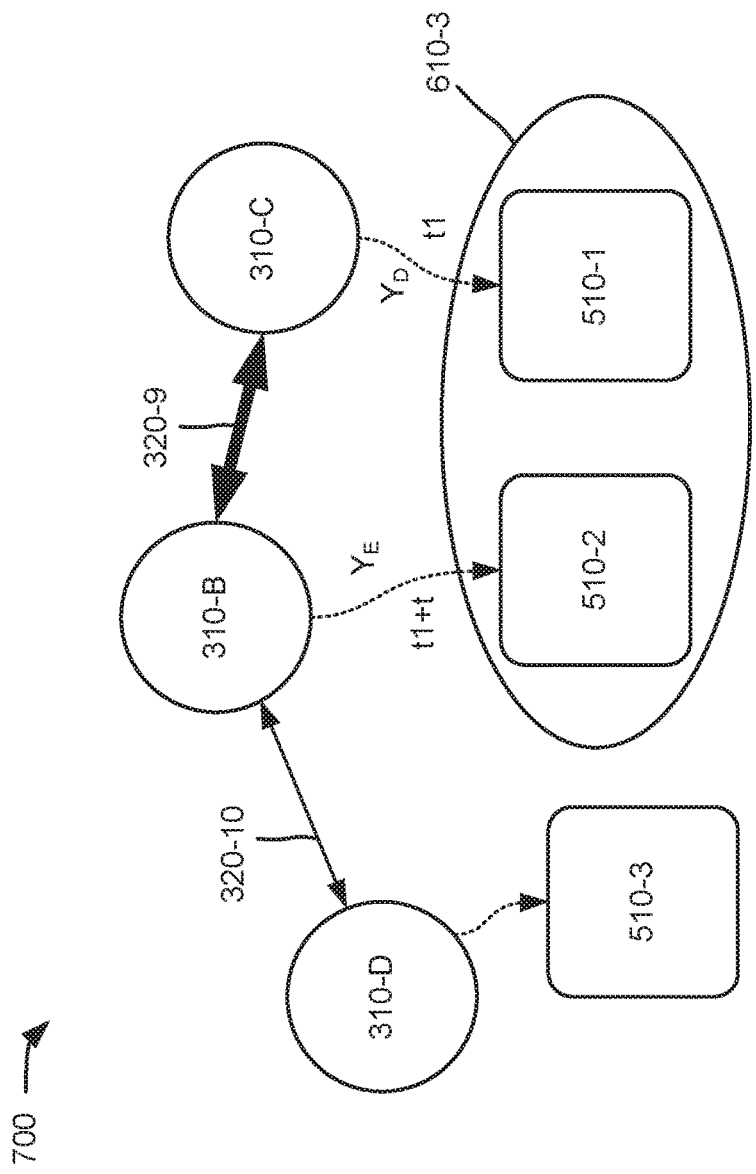
FIG. 7 is a diagram illustrating connection strength variations based on content consumption, in a portion of a social network.

FIG. 7 is a diagram illustrating connection strength variations based on content consumption in a portion of a social network 700. In FIG. 7, assume user nodes 310-B and 310-C share a strong bi-directional connection 320-9 (i.e., C-to-B and B-to-C), while user nodes 310-B and 310-D share a weak bi-directional connection 320-10 (i.e., D-to-B and B-to-D).

Assume that node 310-C accesses a content node 510-1 at a time t1, and that node 310-B fails to access content node 510-1 within the correlation time window T. Thus, Hebbian-based recommender 110 may determine that node 310-C's action has not influenced node 310-B, which is inconsistent with the fact that there is a strong connection (e.g., connection 320-9) between those nodes. Based on the determination that node 310-C did not influence node 310-B, Hebbian-based recommender 110 will decrease the weight of connection 320-9 (C-to-B), and the amount of decrease in weight will be proportional to the difference between the expected outcome and the actual outcome, which is relative high in this instance. As noted in connection with the example of FIG. 5C, the learning factor for decreasing connection weights can be different (i.e., lower) than the learning factor for increasing the connection weights.

Still referring to FIG. 7, assume content nodes 510-1 and 510-2 are associated as a group 610-3. For example, Hebbian-based recommender 110 may identify group 610-3 through the use of clustering and other unsupervised algorithms. Hebbian-based recommender 110 may use group 610-3 to predict a trend. For example, if content node 510-1 increases in viewership (or number of downloads, streams, etc.), content node 510-2 has a good chance of having an increase in viewership also.

In one implementation, notifications can be sent (e.g., to user devices 160) based on groups as identified in connection with FIGS. 6 and 7. For example, nodes 310 (representing users 170) that are part of the same group can receive notifications on activity or content accessed by any member of the group. In another implementation, notifications can be sent to all nodes connected to a given node with strong connections, where the threshold for what connection strength triggers a notification can be configurable. Thus, users could then provide their appetite for notifications in term of a range, such as a notification level. The notification level may be selected from, for example, all, some, few, or none, where the connection strength thresholds can be varied based on the level. "All" would indicate no/low connection strength threshold for notifications; "some" could indicate a relatively low connection strength threshold; "few" could indicate a relatively high connection strength threshold; and "none" would could indicate no notifications are desired. For example, if "few" were selected, users strongly connected to one node ("node A") would receive notifications based on node A's activity, whereas other nodes with a weak connection to node A would not receive notifications when the "few" notification level is selected.

Nodes with high cumulative outgoing connection strengths can be inferred to be "influencers" in the content-based social network. Nodes with high cumulative outgoing connection strengths that are also part of multiple groups can be inferred to be "hubs" and are influencers in different mutually exclusive groups. Nodes with high cumulative incoming connection strengths can be inferred to be "influenced" in the network. Highly influenced users are useful in determining the reach of relevant content or advertising in the network. Small sub-networks with high degree of strong interconnectivity and have strong outgoing connections to other parts of the network are also "hubs" and are major influencers.

Figure 8:
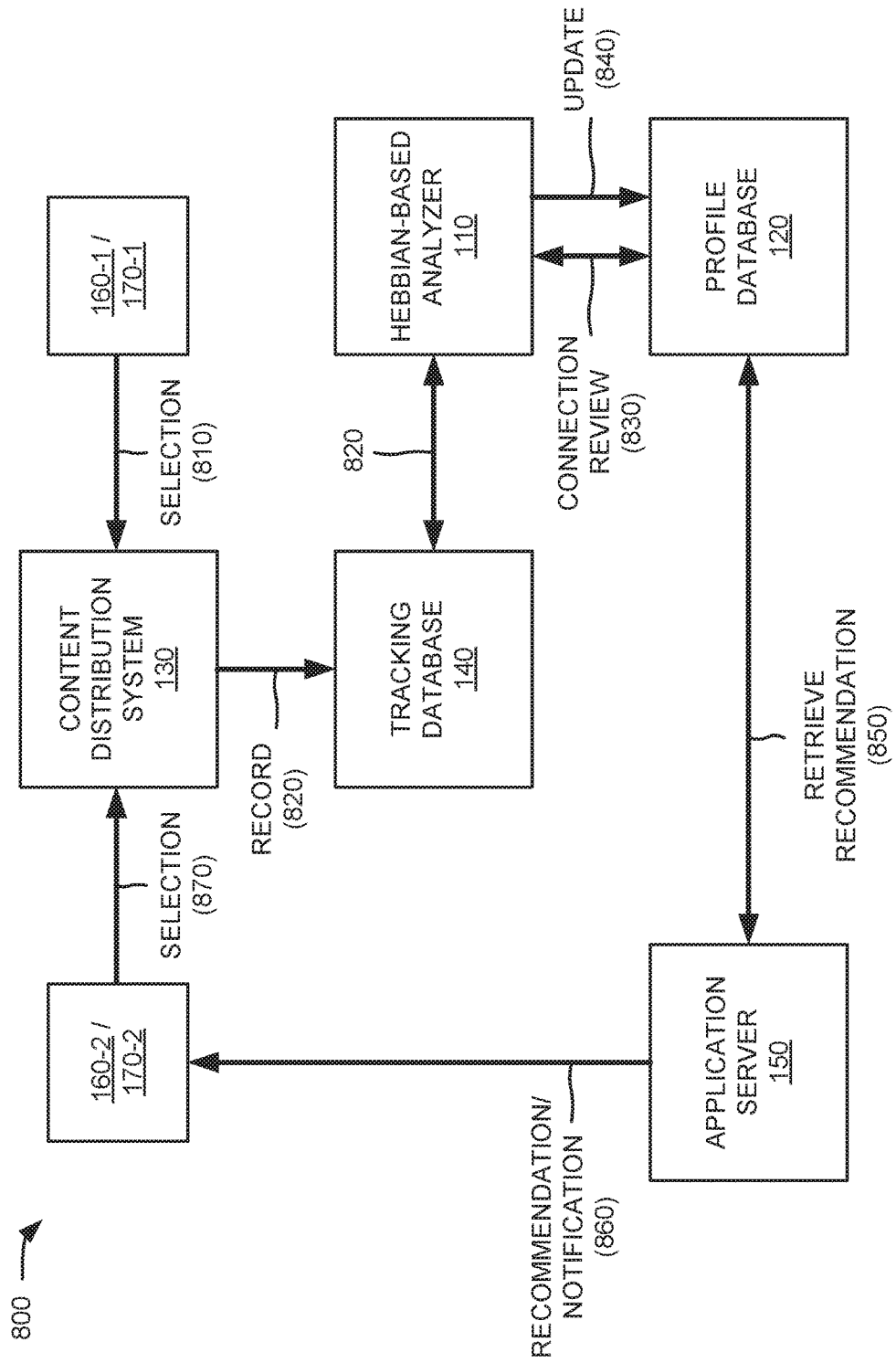
FIG. 8 is a diagram illustrating exemplary profiles used by the Hebbian-based recommender of FIG. 1 to generate recommendations.
Figure 9:
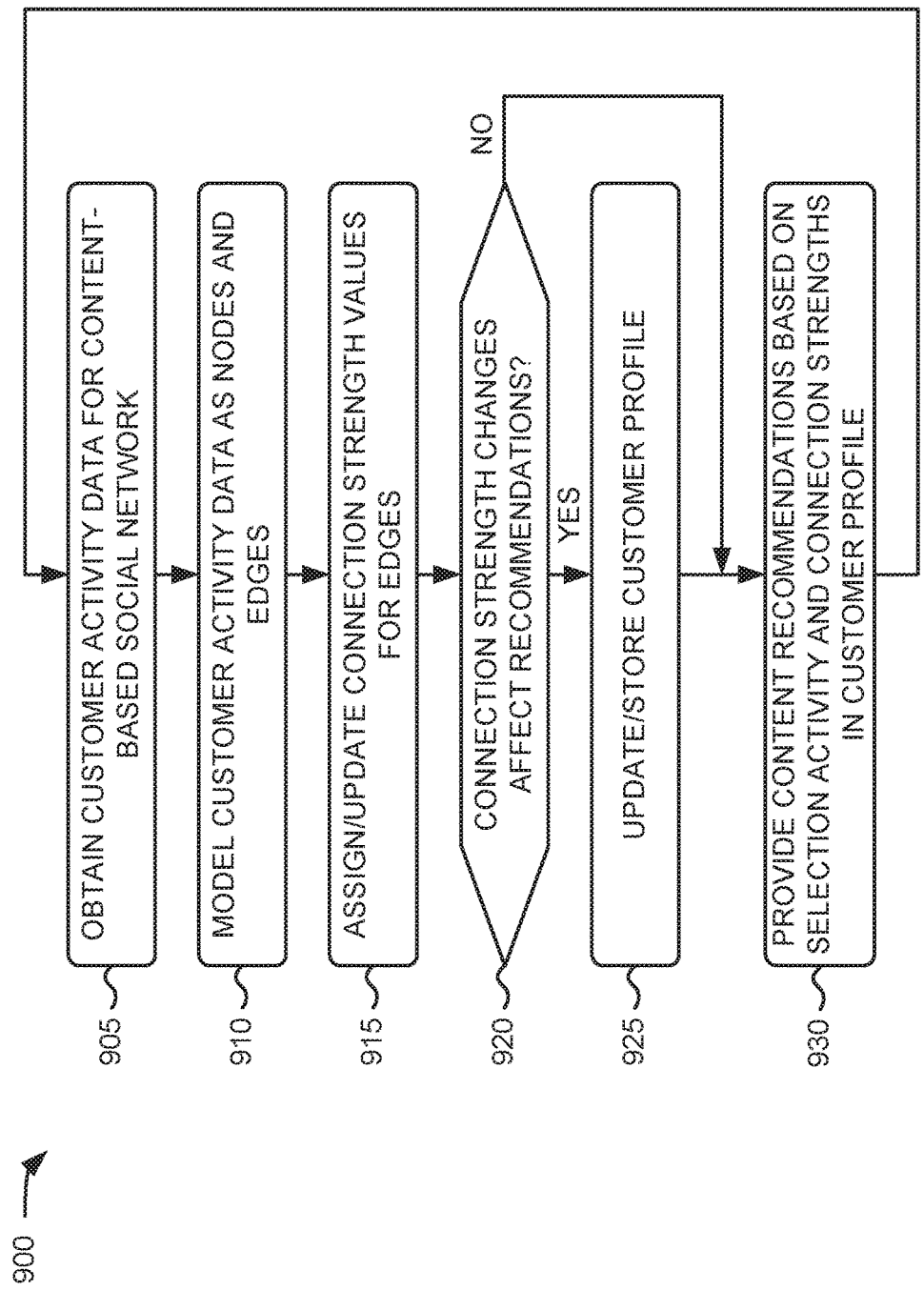
FIGS. 9-13 are flow diagrams illustrating exemplary processes for generating content recommendations according to an implementation described herein.

FIG. 8 is a diagram illustrating exemplary communications in a portion 800 of network environment 100. FIG. 8 shows communications that may occur to provide a recommendation to a user device 160. As shown in FIG. 8, network portion 800 may include Hebbian-based recommender 110, profile database 120, content delivery system 130, tracking database 140, and customer devices 160-1 and 160-2.

Customer device 160-1 receives an indication from user 170-1 of a selection 810 for particular content. Selection 810 may be provided to content delivery system 130. In response, the content may be provided to customer device 160-1 for consumption by a user 170-1 (communication not shown) and a record 820 of the user's selection may be logged in tracking database 140. Record 820 may include, for example, a content selection identifier, a user identifier, and a selection time associated with the user's selection of the content.

Hebbian-based recommender 110 may extract record 820, along with records from other users' selections that are stored in tracking database 140. Using techniques described above (e.g., in connection with FIGS. 3-7), Hebbian-based recommender 110 may apply record 820 to an existing social network model and conduct a connection review 830 for connections related to user 170-1. Assuming connections of other users (e.g., user 170-2 of customer device 160-2) are identified. Hebbian-based recommender 110 may provide an update 840 to profile database 120 to reflect changes in connection weights based on information in record 820 and previous activities in tracking database 140 (e.g., selections of the same content by other connected user nodes). Update 840 may include, for example, recommendations for other users (e.g., users with strong connections to user 170-1) of the content associated with selection 810.

Application server 150 may retrieve a recommendation from profile database 120, as indicated by reference 850. For example, application server 150 may receive an update request from user device 160-2 executing a mobile video app (e.g., application 215) for a content-based social network, and retrieve a recommendation for user 170-2 from profile database 120. Application server 150 may forward the retrieved recommendation 850 as a recommendation/notification 860 for the mobile video app associated with user 170-2 on customer device 160-2. Customer device 160-2 may receive recommendation/notification 860 and may present the recommendation to user 170-2. Assuming user 170-2 chooses the content of the recommendation (e.g., within a designated correlation time window), customer device 160-2 may provide a selection 870 to content delivery system 130, which will be recorded and integrated into the social network model of Hebbian-based recommender 110. User 170's non-selection of recommendation may also be used to increase or decrease a connection weight value.

FIGS. 9-13 are flow diagrams illustrating an exemplary process 900 for generating content recommendations according to an implementation described herein. According to an implementation, process 900 may be implemented by Hebbian-based recommender 110. For example, processor 205 may execute application 215 to perform the steps described.

Process 900 may include obtaining customer activity data for a content-based social network (block 905) and modeling the customer activity data as nodes and edges (block 910). For example, Hebbian-based recommender 110 may access records from content delivery system 130 and/or tracking database 140. Hebbian-based recommender 110 may assemble a model, such as simplified social network model 300 of FIGS. 3 and 4, that includes multiple customer nodes 310 and edges of direct connections 320 and indirect connections 330.

Process 900 may also include assigning and/or updating connection strength values for the edges (block 915). For example, similar to values assigned in Table 1 above, Hebbian-based recommender 110 may assign high initial weight values to direct connections 320 and low or nominal initial weight values to indirect connections. As more user selection activity is processed, the initial weight values of direct and indirect connections may be changed to reflect user responses to other user's selection activity.

Process 900 may further include determining if connection strength changes affect recommendations (block 920). For example, Hebbian-based recommender 110 may determine if activity data and the resulting changes in node connection weights affects potential recommendations (e.g., content recommendations) for user nodes in the social network model.

If connection strength changes affect recommendations (block 920—YES), process 900 may include updating and storing a customer profile (block 925). For example, Hebbian-based recommender 110 may provide an update for each user profile to reflect recommendations for content based on activity from nodes with the highest weighted connections to each user node (e.g., and accounting for redundancies or other factors). The top recommendations for each user may be stored with a corresponding user profile (e.g., in profile database 120).

If connection strength changes do not affect recommendations (block 920—NO) or after the customer profile is updated, process 900 may include providing content recommendations based on selection activities and the connection strengths in the customer profile (block 930). For example, application server 150 may retrieve content recommendations from a particular user profile in response to requests from a mobile video application being executed on customer device 160. Process 900 may loop back to block 905 to obtain customer activity for another time interval and/or another user.

Figure 10:
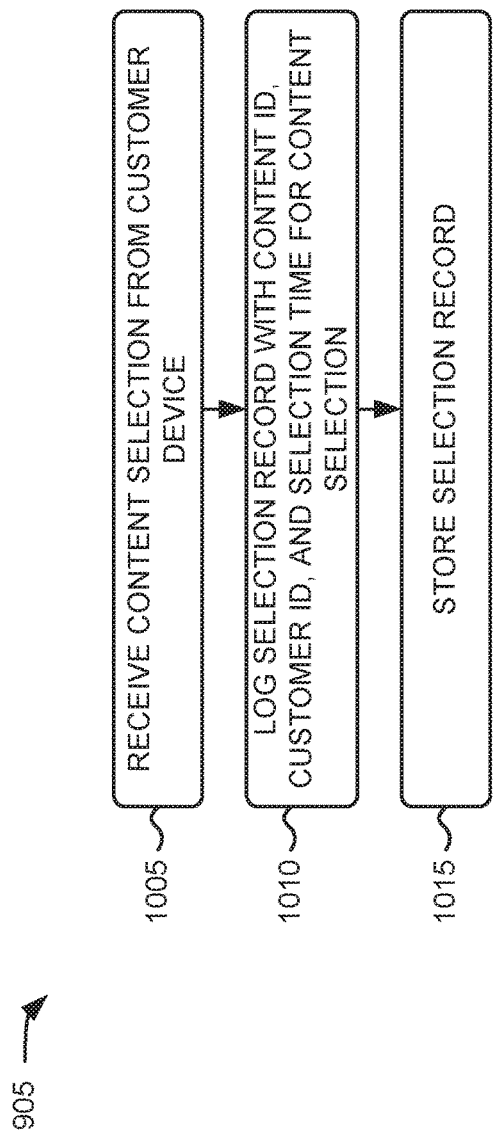

Process block 905 may include the process blocks shown in FIG. 10. As shown in FIG. 10, process block 905 may include receiving a content selection form a customer device (block 1005), logging a selection record with a content identifier, a customer identifier, and a selection time for the content selection (block 1010), and storing the selection record (block 1015). For example, as shown in FIG. 8, content delivery system 130 may receive a selection 810 of content from user device 160-1, and log a record 820 of the user's selection in tracking database 140. Record 820 may include, for example, a unique content identifier, a user identifier, and a selection time associated with the user's selection of the content.

Figure 11:
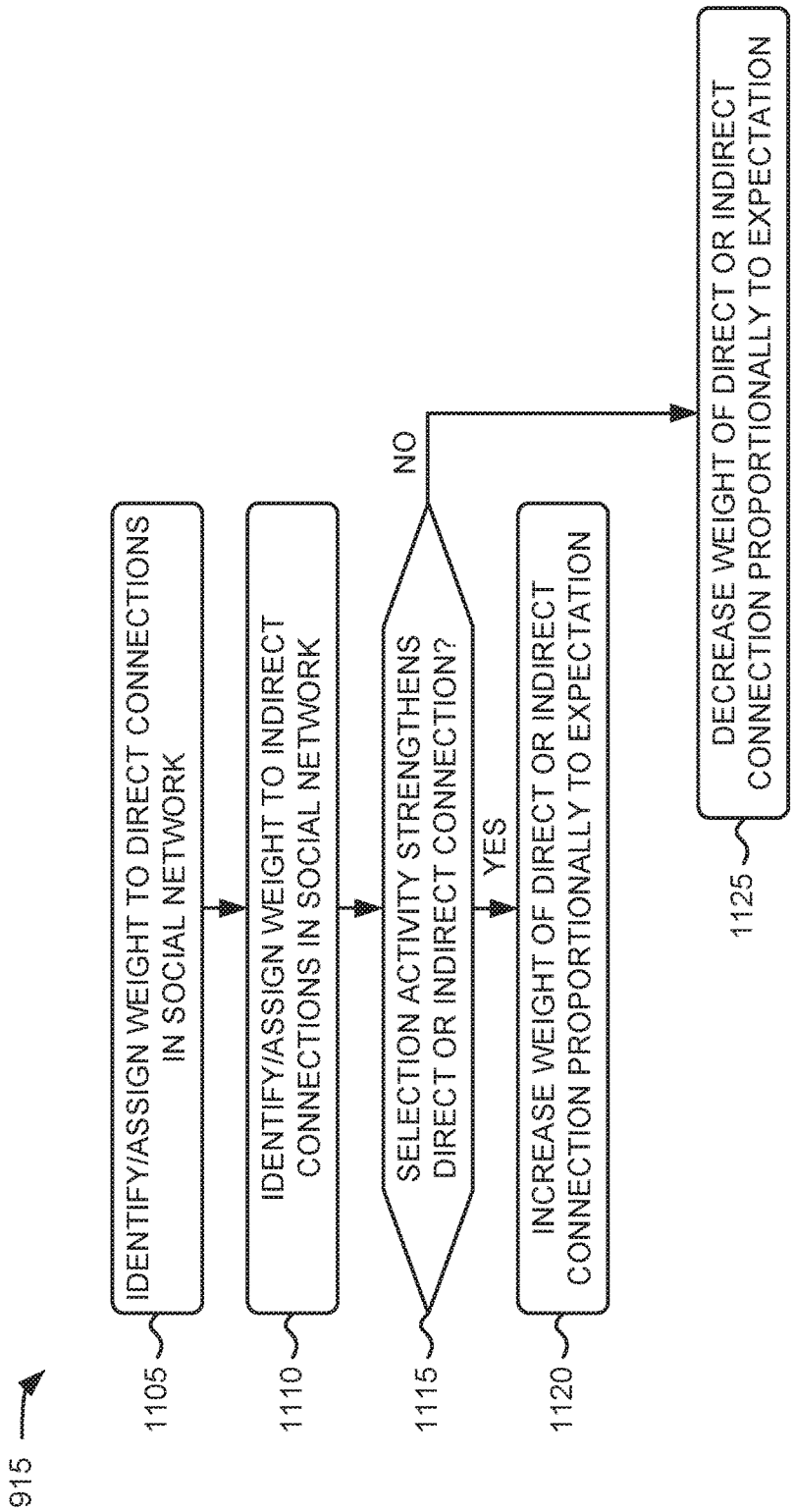

Process block 915 may include the process blocks shown in FIG. 11. As shown in FIG. 11, process block 915 may include identifying and assigning weights to direct connections in a social network (block 1105) and identifying and assigning weights to indirect connections in the social network (block 1110). For example, as shown in FIG. 3, Hebbian-based recommender 110 may identify direct two-way connections between friends and direct one-way connections for followers in the social network. Also, as shown in FIG. 4, Hebbian-based recommender 110 may identify indirect connections between any nodes that do not have direct connections. Initial weights of direct connections may be heavily weighted (e.g., with a value of 1) while indirect connections may be nominally weighted (e.g., with a value of 0.001).

Process block 915 may also include determining if a selection activity strengthens a direct or indirect connection (block 1115), increasing a weight of a direct or indirect connection proportionally to an expectation when a selection activity strengthens the direct or indirect connection (block 1120), and decreasing a weight of a direct or indirect connection proportionally to an expectation when a selection activity strengthens the direct or indirect connection (block 1125). For example, as described above in connection with FIGS. 5A and 5B Hebbian-based recommender 110 may use temporally correlated activity to increase a connection weight in proportion to an expected activity. Conversely, as described above in connection with FIG. 5C, Hebbian-based recommender 110 may decrease a connection weight in proportion to an expected activity when a temporally correlated activity does not occur.

Figure 12:
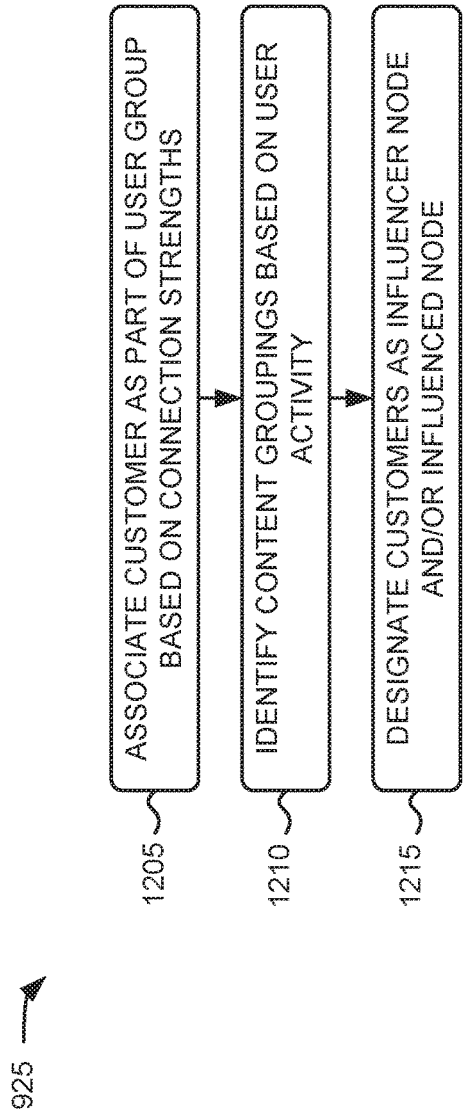

Process block 925 may include the process blocks shown in FIG. 12. As shown in FIG. 12, process block 925 may include associating a customer as part of a group based on connection strengths (block 1205), identifying content groupings based on user activity (block 1210), and designating users as influencer nodes or influenced nodes (block 1215). For example, referring to FIG. 6, Hebbian-based recommender 110 may identify groups based on connectivity, threshold weights, and/or number of groups desired. According to implementations herein, groups can be learned by Hebbian-based recommender 110 through the use of clustering and other well-known or conventional unsupervised algorithms. Hebbian-based recommender 110 may apply a similar approach to content nodes to group content with other content using correlated activity on those content nodes. Nodes with high cumulative outgoing connection strengths can be inferred to be "influencers" in the content-based social network. Nodes with high cumulative incoming connection strengths can be inferred to be "influenced" in the network.

Figure 13:
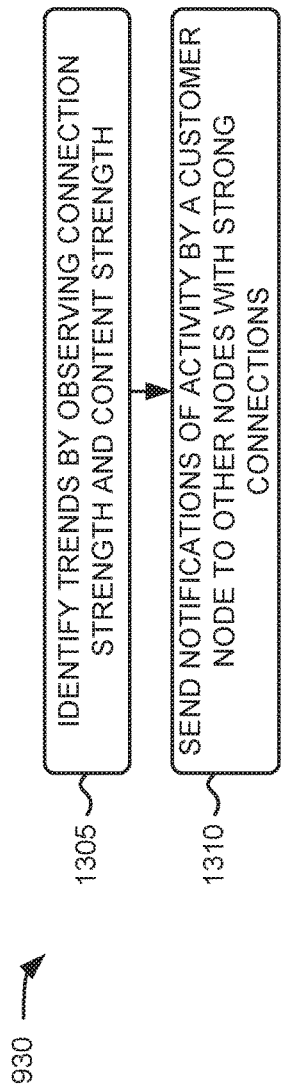

Process block 930 may include the process blocks shown in FIG. 13. As shown in FIG. 13, process block 930 may include identifying a trend by observing connection strengths and content strengths in the content-based social network (block 1305), and sending notifications of activity by a customer node to other nodes with strong connections (block 1310). For example, Hebbian-based recommender 110 may use groups, such as those described in connection with FIGS. 6 and 7 to predict a trend. Furthermore, application server 150 may send notifications to user devices 160 based on groups as identified in connection with FIGS. 6 and 7. For example, nodes 310 that are part of the same group can receive notifications on activity or content accessed by any member of the group.

Using the content-based social network models with Hebbian-based learning as described herein, recommendations and/or notifications may be targeted to users based on connection strengths that are learned/adjusted over time. Thus, in one implementation, recommendations may be identified without regard for genre, keywords, or other type of content descriptors. In other implementations, content metadata may be used as a secondary factor in rating or selecting connection-based recommendations.

In the preceding specification, various preferred embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 9-13, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise. The term "exemplary," as used herein means "serving as an example." Any embodiment or implementation described as "exemplary" is not necessarily to be construed as preferred or advantageous over other embodiments or implementations.

What is claimed is:

1. A method comprising:
   obtaining, by a network device, customer activity data for a content-based social network defined by users of a mobile video programming service;
   modeling, by the network device, the customer activity data as nodes and edges within the content-based social network, the nodes representing users and the edges representing unidirectional connections between the users, wherein the unidirectional connections between the users are assigned from:
   bidirectional relationships based on user-designated social media connections agreed upon by two of the users, unidirectional relationships based on user-designated social media connections of a single user to receive information from another of the users, and non-designated relationships between the users;

assigning, by the network device, first initial weights to a first group of the edges based on the bidirectional relationships and the unidirectional relationships;

assigning, by the network device, second initial weights to a second group of the edges based on the non-designated relationships, wherein the second initial weights are smaller than the first initial weights;

adjusting, by the network device, the first and second initial weights in response to temporally correlated selection of a content item from the mobile video programming service by two or more of the nodes, as indicated in the customer activity data, to provide adjusted weights, wherein the adjusting further comprises:

increasing one or more of the first and second initial weights by an amount that is proportional to a difference between an expected outcome of the temporally correlated selection of a content item and an actual outcome of the temporally correlated selection of a content item, or decreasing one or more of the first and second initial weights by an amount that is proportional to the difference between the expected outcome of the temporally correlated selection of a content item and the actual outcome of the temporally correlated selection of a content item, and wherein the expected outcome is one of:

selecting particular content by the particular node, which was previously selected by the other node, within a correlation time window; and failing to select the particular content by the particular node, which was previously selected by the other node, within the correlation time window;

identifying, by the network device, a content recommendation for a particular node of the two or more nodes based on an activity to access content by another node of the two or more nodes and one or more of the adjusted weights;

storing, by the network device, a customer profile including the content recommendations associated with the particular node; and providing, by the network device, the content recommendation to a user device associated with the customer profile.

2. The method of claim 1, wherein the customer activity data includes records of selections of content items from a catalog of available content items and selections of recommended content items.

3. The method of claim 2, wherein the content items include one of television content, video-on-demand content, peer-to-peer content, or advertising content.

4. The method of claim 1, wherein assigning the second initial weights further comprises:

assigning nominal second initial weights, relative to the first initial weights, to the second group of the edges based on the non-designated relationships.

5. The method of claim 1, wherein the customer profile includes one or more of:

a group association of the customer based on the adjusted weights, an influencer designation, or an influenced designation.

6. The method of claim 5, wherein providing the content recommendation includes one or more of:

identifying a viewership trend for particular content and providing the content recommendation based on the trend; and sending the content recommendation to all nodes within a same group as a node that previously selected the particular content.

7. The method of claim 1, wherein the customer profile includes a connection strength threshold for notifications, and wherein providing the content recommendation includes sending the content recommendation to all nodes having adjusted weights of corresponding edges that exceed the connection strength threshold.

8. The method of claim 1, wherein the customer activity data includes records of selections of content items from a catalog of available content items.

9. The method of claim 1, wherein the customer activity data includes records of selections of recommended content items.

10. A device comprising:

one or more memories to store instructions; and one or more processing systems to execute the instructions that configure the one or more processing systems to:

obtain customer activity data for a content-based social network defined by users of a mobile video programming service;

model the customer activity data as nodes and edges within the content-based social network, the nodes representing users and the edges representing unidirectional connections between the users, wherein the unidirectional connections between the users are assigned from:

bidirectional relationships based on user-designated social media connections agreed upon by two of the users, unidirectional relationships based on user-designated social media connections of a single user to receive information from another of the users, and non-designated relationships between the users;

assign first initial weights to a first group of the edges based on the bidirectional relationships and the unidirectional relationships;

assign second initial weights to a second group of the edges based on the non-designated relationships, wherein the second initial weights are nominal, relative to the first initial weights, based on the non-designated relationships;

adjust the first and second initial weights in response to temporally correlated selection of a content item from the mobile video programming service by two or more of the nodes, as indicated in the customer activity data, to provide adjusted weights, wherein the adjusting includes increasing one or more of the first and second initial weights by an amount that is of a first proportion to a difference between an expected outcome of the temporally correlated selection of a content item and an actual outcome of the temporally correlated selection of a content item, when the expected outcome is selecting particular content, which was previously selected by another node, within a correlation time window;

identify a content recommendation for a particular node of the two or more nodes based on an activity to access content by another node of the two or more nodes and one or more of the adjusted weights;

store, a customer profile including the content recommendations associated with the particular node; and provide the content recommendation to a user device associated with the customer profile.

11. The device of claim 10, wherein the customer activity data includes records of selections of content items from a catalog of available content items and selections of recommended content items.

12. The device of claim 10, wherein the content item includes advertising content.

13. The device of claim 10, wherein when adjusting the first and second initial weights, the one or more processing systems execute the instructions that further configure the one or more processing systems to:

decrease one or more of the first and second initial weights by an amount that is of a second proportion to a difference between another expected outcome of the temporally correlated selection of a content item and the actual outcome of the temporally correlated selection of a content item, when the other expected outcome is failing to select the particular content, which was previously selected by the other node, within the correlation time window.

14. The device of claim 10, wherein the customer profile includes one or more of:

a group association of the customer based on the adjusted weights, an influencer designation, or an influenced designation.

15. The device of claim 10, wherein when providing the content recommendation, the one or more processing systems execute the instructions that further configure the one or more processing systems to:

identify a group, based on the adjusted weights, that includes a node that previously selected particular content, and send the content recommendation to all nodes within the group.

16. The device of claim 10, wherein the customer activity data includes records of selections of recommended content items.

17. The device of claim 10, wherein the customer activity data includes records of selections of recommended content items.

18. A non-transitory computer-readable medium storing instructions for:

obtaining customer activity data for a content-based social network defined by users of a mobile video programming service;

modeling the customer activity data as nodes and edges within the content-based social network, the nodes representing users and the edges representing unidirectional connections between the users, wherein the unidirectional connections between the users are assigned from:

bidirectional relationships based on user-designated social media connections agreed upon by two of the users, unidirectional relationships based on user-designated social media connections of a single user to receive information from another of the users, and non-designated relationships between the users;

assigning first initial weights to a first group of the edges based on the bidirectional relationships and the unidirectional relationships;

assigning second initial weights to a second group of the edges based on the non-designated relationships, wherein the second initial weights are nominal, relative to the first initial weights, based on the non-designated relationships;

adjusting the first and second initial weights in response to temporally correlated selection of a content item from the mobile video programming service by two or more of the nodes, as indicated in the customer activity data, to provide adjusted weights, wherein the adjusting includes increasing one or more of the first and second initial weights by an amount that is of a first proportion to a difference between an expected outcome of the temporally correlated selection of a content item and an actual outcome of the temporally correlated selection of a content item, when the expected outcome is selecting particular content, which was previously selected by another node, within a correlation time window;

identifying a content recommendation for a particular node of the two or more nodes based on an activity to access content by another node of the two or more nodes and one or more of the adjusted weights;

storing a customer profile including the content recommendations associated with the particular node; and providing the content recommendation to a user device associated with the customer profile.

19. The non-transitory computer-readable medium of claim 18, wherein the instructions for adjusting the initial weights further include instructions for:

increasing one or more of the first and second initial weights by an amount that is proportional to a difference between an expected outcome of the temporally correlated selection of a content item and an actual outcome of the temporally correlated selection of a content item, or decreasing one or more of the first and second initial weights by an amount that is proportional to the difference between the expected outcome of the temporally correlated selection of a content item and the actual outcome of the temporally correlated selection of a content item, wherein the expected outcome of the temporally correlated selection of a content item includes a user selection of television content or video-on-demand content that corresponds to the content recommendation.

20. The non-transitory computer-readable medium of claim 18, wherein the customer activity data includes records of selections of content items from a catalog of available content items and selections of recommended content items.

* * * * *